Figure 1:
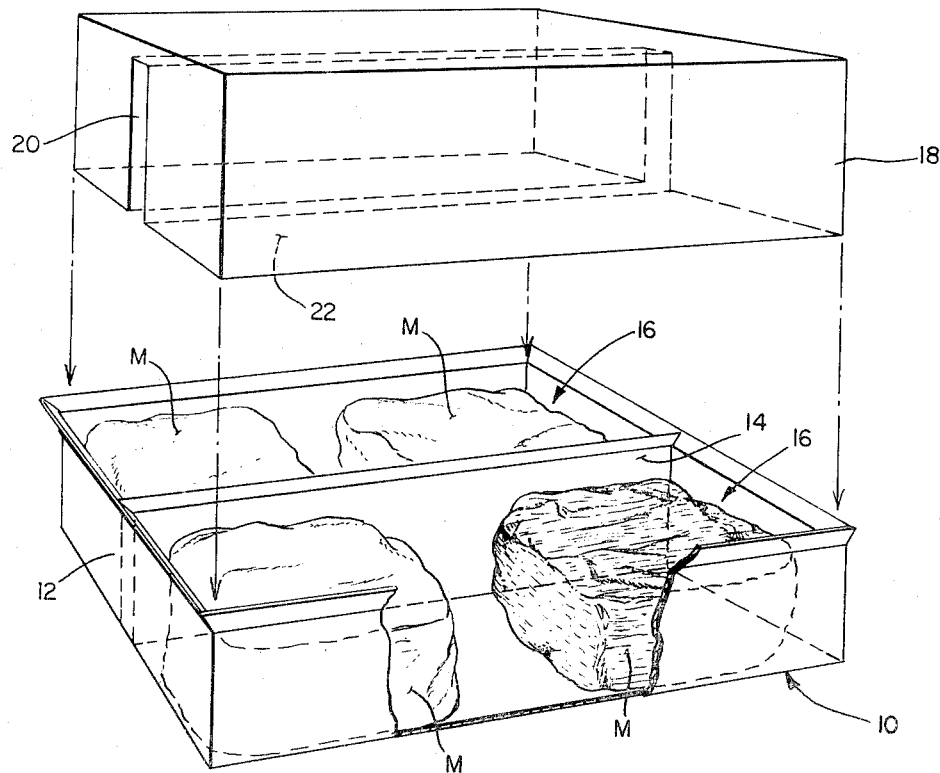

United States Patent
Korten

[15] 3,635,731
[45] Jan. 18, 1972

[54] PROCESS FOR TENDERIZING MEAT

[72] Inventor: Charles W. Korten, Cinnaminson, N.J.
[73] Assignee: Campbell Soup Company, Camden, N.J.
[22] Filed: Mar. 18, 1969
[21] Appl. No.: 808,276

[52] U.S. Cl. ..............................................99/107, 99/194
[51] Int. Cl. .....................................A22c 18/00, A23b 1/06
[58] Field of Search ..................99/107, 194, 349; 17/25, 26, 17/30; 100/214, 240, 245, 53, 57, 232, 176, DIG. 10

[56] References Cited

UNITED STATES PATENTS

| | | | |
|---|---|---|---|
| 2,244,540 | 6/1941 | Lenzke | 100/57 |
| 2,398,636 | 4/1946 | Henney et al. | 99/107 |
| 2,513,025 | 6/1950 | Jackson | 99/107 X |
| 3,179,039 | 4/1965 | Christensen | 100/232 X |

*Primary Examiner*—Hyman Lord
*Attorney*—Howson and Howson

[57] ABSTRACT

A process for mechanically tenderizing meat for human consumption after the carcass has been separated into primal cuts which have muscle fibers arranged substantially in the same direction, by applying pressure within the range of 50 to 100 pounds per square inch against two opposing surfaces of the meat cut perpendicularly to the direction of the muscle fibers, and preventing expansion of the cut in a direction across the fibers while permitting deformation in the direction of the muscle fibers. This invention provides apparatus for accomplishing the above process which includes a container having a width substantially the same as that of the meat cut measured across the grain and a length greater than the length of the cut measured in the direction of the fibers. A compressing plug presses the meat in the container causing the meat to deform in the direction of the fibers but not across the grain thereby disrupting and separating the connective tissue from the muscle fibers and rendering the meat more tender for human consumption. A pair of compressing rolls forming a nip is advantageously used on cuts having a thickness less than 2 inches.

2 Claims, 2 Drawing Figures

PATENTED JAN 18 1972

3,635,731

INVENTOR.
Charles W. Korten
BY
Harold J. O'Brien
ATTORNEY.

PROCESS FOR TENDERIZING MEAT

This invention relates generally to a simple and economical process for causing meat portions, such as primal cuts of beef, to be more tender when chewed and therefore more desirable for human consumption. In particular, this invention teaches a unique process for tenderizing meat by the application of mechanical pressure within a certain range which may be advantageously employed with other well-known processes for preparing meat for human consumption.

Many factors affect the tenderness of a selected cut or portion of meat. There are the preslaughter factors which include the sex, age, diet and heredity of an animal such as a beef cow or steer which are largely beyond the scope of this invention. Also, there are certain postslaughter factors which contribute to the tenderness of the meat and these include the length of aging time following slaughter, whether or not the meat has been frozen and defrosted and the cooking process employed. It has been found that the tenderness of a meat cut is governed by two factors: the state of the muscle protein and the kind and amount of the connective tissue. The condition of the muscle protein is affected by the chemical process referred to as rigor mortis and so this invention is directed to a process which brings about changes largely in the connective tissue in the meat to produce greater tenderness. Because of the large amounts of meat consumed and relative high price of meat in comparison with other foods in the family budget, it is highly desirable that improvements be made in the known techniques for improving the tenderness of meat and making it more enjoyable for human consumption.

Therefore, it is the primary object of this invention to provide a unique process for tenderizing meat which will supplement the known methods of making meat more edible for human consumption.

It is another object of this invention to provide a process of tenderizing meat which can be accomplished economically and as part of a series of operations in preparing the meat for human consumption.

It is another object of this invention to provide relatively simple apparatus for affecting the process of this invention in an efficient manner.

Figure 2:
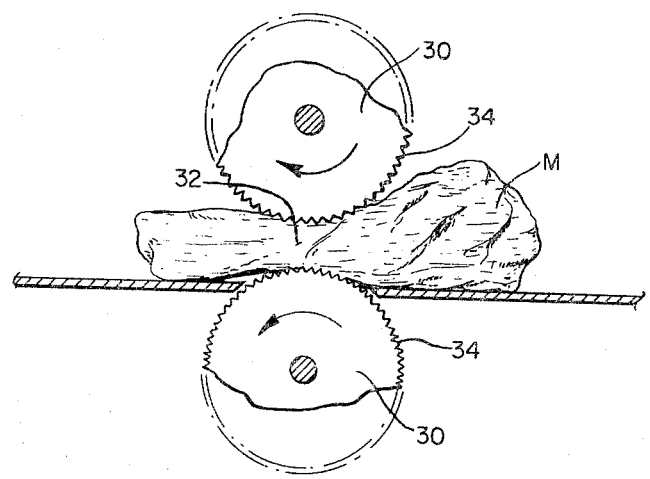

These and other objects of this invention will become more apparent from the following description, wherein the preferred form of the process and apparatus of this invention are shown, and from the drawing attached thereto, wherein:

FIG. 1 is a schematic view of a container and plug with certain portions cut away in which the meat is pressed; and FIG. 2 is a schematic view of pressing rolls with certain portions not shown adapted to press thin slices of meat according to this invention.

The process of this invention is best understood as one step in a series of steps followed in preparing the meat portions of livestock for human consumption and a short description of the general process may be helpful in understanding this invention. In the meat-producing industry for boneless beef, livestock such as beef cows or steers, are slaughtered, bled, skinned, eviscerated, and then the carcass is halved and hung in a chill room at about 34° F. for an initial chilling period of 48 hours. The carcass is then boned and the skeletal muscles are cut and separated along their natural muscle separations to form primal cuts. The preferred muscle segments of the hindquarter are referred to as the outside, inside and knuckle muscles and, on the average, the first two muscles weigh about 10–15 pounds while the latter weighs about 7–10 pounds. The muscle segments are generally shaped as a cube or six-sided polyhedron and approximately 10 to 15 inches in length, 7 to 10 inches in width, and 3 to 4 inches in thickness. After chilling and separation, and depending upon the nature of the final product desired, the primal cuts may be frozen for later use or cooked, diced, then canned and finally cooked again with vegetables to form, for example, a canned stew product. The cooking step may include cooking the meat in a liquid at substantially boiling temperature for 1 hour or more so that its internal temperature reaches in excess of 160° F.

Although the structure of the meat (muscle) taken from the hindquarters, body portion and forelegs differ depending largely on the function of the muscle, the diet and the age of the animal, the muscles in all cases are composed of generally long, rectangular fibers held together by a network of connective tissues. The muscle fibers consist of elongated protein filaments called fibriles or myofibriles which are cross-striated to form a unit called a sacromere which repeats itself every few microns. The myofibriles are composed of alternating layers of actin and myosin filaments which slide past each other as the fibers stretch or contract. Connective tissue consists of collagenous, elastic, and reticular protein fibers embedded in an amorphous ground substance. When viewed under magnification, the muscle fibers appear as elongated, generally rectangular units extending in parallel lines in one direction which is referred to as the "grain" of the muscle. When the muscle is cut across the grain and viewed from the cut end, the fibers are seen as smaller squarelike shapes separated by other tissue.

Meat has been graded for its tenderness for many years and the term "tenderness" is used herein to describe the mechanical properties of a piece of meat which can be measured subjectively by chewing or objectively by mechanical testing machines such as a shear press.

In making the discovery of this invention, it was found that when controlled deformative pressure was applied perpendicular to a meat cut confined so as to support the fibers across the grain while permitting them to stretch along the grain, the resulting deformation altered and disrupted the connective tissue existing in and around the muscle fibers. Apparently the connective tissue was expanded beyond its elastic limit and began to break up and separate from the muscle fibers. This process did not substantially break the muscle fibers or their cellular structure but the deformation of the connective tissue caused the meat to become more chewable without loss of its natural texture, body and flavor. Specifically, it was found that raw meat after pressing had a distinctive limp feel as if it were stretched beyond its elastic limit. After the meat was washed, broken connective tissue around the primary muscle bundles could be observed. Further, after the pressed meat was cooked and cut across the grain, the cut end had a fuzzy appearance indicating that the muscle proteins had travelled outside the cell and were denatured in this condition. The deformative pressure of this invention apparently does not change the chemical nature of the muscle protein and no shortening of the sarcomere (muscle fiber) has been observed.

The preferred process of this invention may be described as follows. The hindquarter is separated into its primal cuts so that the muscle fibers in each cut extend substantially in the same direction or are parallel to each other. Each cut has, roughly speaking, four sides in which the grain is observed to run along the surface and two ends in which the grain appears to come out of the meat. The meat cut may have portions of varying thickness which do not substantially change the effectiveness of the process of this invention. The preferred pressing procedure is accomplished by placing the meat cut between two, flat, horizontal surfaces or platens in a hydraulic press. It is important that the pressing surfaces contact two of the four surfaces of the cut in which the grain runs and not press the ends against the grain. During the application of pressure, the meat must be supported along the remaining two sides in which the grain extends so that it will not flatten and expand any substantial amount in that direction. When pressure in the range of 50 to 100 pounds per square inch on the meat is applied, the meat deforms in the direction of the grain and the deformation appears to tear and separate portions of the connective tissues from other connective tissue and from the muscle fibers without damaging the muscle fibers.

The effectiveness of the process of this invention is more readily appreciated and understood when the process is employed in conjunction with other known meat-treating techniques and the full procedure can be described as follows.

The sides of beef are chilled at approximately 34° F. for 24 to 48 hours after slaughter and the primal cuts are then bonded out and the meat frozen. When the meat is to be used, it is defrosted at 50°–55° F. for a period not to exceed 48 hours on corrugated racks to permit the expelled fluid to separate from the meat. If the meat has not been frozen following slaughter, it must be chilled or aged for at least 48 hours and preferably 72 hours prior to pressing. Although rigor mortis continues to soften the meat for a period longer than 48 hours, a substantial portion of this chemical change has been completed in the initial period.

The defrosted or fresh raw meat, separated into primal cuts, may be treated in this form or further cut into small, generally rectangular cubes 4 to 6 inches on a side. These smaller diced cuts should be made so that the grain of the fiber extends uniformly in one direction in each cut. It has been found that cuts which are only 1 or 2 inches in thickness are not easily handled in the press apparatus found satisfactory for thicker cuts but that such thin cuts can be pressed by two rolls creating a nip as further described. The primal cuts or the smaller diced cuts are then compressed by a standard hydraulic press whose platens, as illustrated schematically in FIG. 1, are equipped with a bottom container 10 and an upper plug 18. The preferred form of the meat container 10 has four surrounding walls 12 and a center partition 14 which divides the container into two, equalized compartments 16 approximately 24 inches long by 10 inches wide. The container 10 and upper plug 18 are preferably made of stainless steel for sanitation purposes. The width of the compartments 16 is substantially the same as the average width of the primal cuts while the length is greater. Although it is preferable that the cuts touch the wall and partition on their sides, a little space of about 1 to 3 inches will not adversely affect the pressure deformation. If diced cuts are used, they are placed in rows in the container filling it across but not lengthwise. When primal cuts M are placed in container 10, as indicated in FIG. 1, the sides of the cuts preferably touch or are proximate to the sides and center partition but that considerable unoccupied space remains at the ends of the cuts. Approximately 70 percent of the surface area of the container 10 can, for best results, be filled with meat, the unfilled portions being located adjacent the ends of the meat cuts in the direction of the grain to allow deformation into this area. The top plug 18, attached to a top press platen not shown, is shaped complementary to that of container 10 and, consequently, has a center slot 20 into which partition 14 fits when the bottom flat surface 22 of plug 18 descends and presses against the meat M. The two compartment design of container 10 shown in FIG. 1 is intended primarily for treating primal cuts and a single square or rectangular container may be used just as effectively, particularly when the meat is diced into smaller cuts. The press lowers plug 18 so that its bottom surface 22 presses downwardly against the top surfaces of the primal cuts M in container 10 up to a maximum pressure within the range of 50 to 100 pounds per square inch. The exact pressure required is not the same with all selections of meat but similar primal cuts from the same grade animal generally can be effectively treated with the same pressure. The age of the meat and other conditions described above which control its inherent toughness require that greater pressures be used on some cuts than others. If too great pressure is applied, the muscle fibers are broken and crushed resulting in a loss of texture and a mashed product. When subjected to pressure within the range stated, the cuts M deform approximately 30 percent in the direction of the muscle grain to nearly fill the container 10 and acquire a distinct limp feel. The press preferably operates at two speeds; quickly closes to about the surface of the meat and then slows down until the desired pressure is achieved. Maintaining the pressure on the cuts does not enhance the desired effect but pressing can be repeated to advantage if the meat is particularly tough. Even if the meat is thicker at one portion along its length or width, the tenderization is achieved as the cut deforms in the direction of the grain under the pressure. After the top plug 18 has been raised, the meat is removed from the container and cooked for final processing.

As a modification to the container 10 and plug 18 shown in FIG. 1, a pair of driven rolls 30 may be supported to form a nip 32 of desired dimensions through which meat cut M is drawn under pressure. The surfaces of each roll 30 is preferably provided with serrations or teeth 34 so as to grip and pull the meat through the pressure nip as the rolls rotate in the direction indicated. A pair of vertical surfaces located adjacent the ends of the rolls, not shown in FIG. 2, are provided to prevent deformation of the meat sideways from between the rolls and these surfaces provide the lateral support similar to that provided by the sides 12 and partition 14 of the container 10.

The following examples of meat treatment processes illustrate the degree of increased tenderness which can be obtained by application of this invention. The tenderness values are provided for both objective mechanical shear readings in pounds per 20 gram meat samples and for subjective comparisons made by a panel of experts (averaging between 15 and 43 persons) who chewed the product. The panel values are expressed on the basis of a 10-point scale -10 being extremely tender and 1 being unchewable.

EXAMPLE 1

Fresh, boneless beef, primal cuts from the round, were frozen 48 hours after slaughter, water-defrosted and then pressed as described at 80 to 100 pounds per square inch. Additional samples of this meat were held for 48, 72 and 96 hours, respectively, and, without being frozen, were pressed and then cooked. The exact pressure used, within the range of 80–100 p.s.i., was sufficient to produce good, grain-wise deformation of the meat. The meat was then cooked in water at 212° F. for 105 minutes, cooled, diced in ½-inch cubes and then evaluated. Control samples were prepared from the same lot of meat with identical handling except for the processing operation. Panel and shear values for the pressed versus unpressed meat are presented below:

| Sample Identification | | Panel | Shear Press |
|---|---|---|---|
| (1) | Frozen control | 3.7 | 444.5 |
| | Frozen pressed | 6.0 | 365.3 |
| (2) | 48 hr. control | 4.2 | 418.7 |
| | 48 hr. pressed | 5.5 | 317.7 |
| (3) | 72 hr. control | 4.8 | 342.7 |
| | 72 hr. pressed | 5.7 | 301.2 |
| (4) | 96 hr. control | 4.7 | 360.2 |
| | 96 hr. pressed | 6.5 | 307.5 |

EXAMPLE 2

Following the procedure described in Example 1 with the change that the diced meat was canned in gravy and given an additional cooking of 60 minutes at 250° F., the following results were obtained:

| Sample Identification | | Panel | Shear Press |
|---|---|---|---|
| (1) | Frozen control | 5.0 | 323.0 |
| | 1 Frozen pressed | 7.7 | 192.2 |
| (2) | 48 hr. control | 5.7 | 305.2 |
| | 48 hr. pressed | 7.7 | 187.0 |
| (3) | 72 hr. control | 6.5 | 268.8 |
| | 72 hr. pressed | 7.8 | 158.3 |
| (4) | 96 hr. control | | 286.7 |
| | 96 hr. pressed | 8.2 | 140.2 |

It can be readily observed from the above tests that pressing the meat according to the method of this invention enhances the tenderness of the meat. In example 1 and especially in example 2, the difference in the values is noteworthy as the shear value were reduced by approximately 50 percent and the panel values showed improvement in the area of 30 percent.

The pressure necessary to achieve the optimum tenderizing effect without causing the muscle fibers to lose their texture depends, to a large extent, upon the toughness of the meat. This toughness can be reduced by standard meat-treating procedures such as aging, freezing and cooking. The following examples show how the ranges of preferred pressure varies when the meat is initially prepared in different ways.

EXAMPLE 3

The animal is slaughtered, dressed in the normal manner, and the split carcass hung in a 34° F. chilled room for 72 hours. The meat is then separated into primal cuts with the excess fat trimmed off. Primal cuts of approximately the same size are pressed according to this invention at a pressure within the range of 80–90 p.s.i. After pressing, the meat is cooked and used, for example, in some manufactured product such as a canned stew. The meat may also be frozen either before or after cooking for later use. After testing, the meat was found to have the improved tenderness reflected in examples 1 and 2.

EXAMPLE 4

The animal is handled as described in example 3 except that a chilling period of about 96 hours is employed and improved tenderization can be achieved after pressing in the range of 70–80 p.s.i. Lower pressures can successfully be employed when the meat is held for longer periods.

EXAMPLE 5

The carcass or primal cuts sliced from the carcass after the initial 72 hour chilling period, are frozen as individual units. The meat, then, is air-defrosted in a cooler or placed in water at a temperature of approximately 100° F. The freezing procedure has a tenderizing effect on the meat, and pressures in the range of 60–70 p.s.i. will produce the desired effect. If the chilling period were extended and combined with the freezing procedure, the pressing deformation would require even less pressure than 60 p.s.i.

EXAMPLE 6

The chilled carcass is boned into primal cuts and then further sliced into pieces approximately 4 inches by 4 inches by 4 before pressing. The pieces of meat are aligned in the container so that so far as possible the grain of the meat runs in the direction of the box length and perpendicular to the container surface. A wedge-shaped plug may be used and the container is turned 180° after the initial pressing operation before the cycle is repeated. Pressure in the range of 80–90 p.s.i. is optimum for meat held 72 hours after slaughter. As described in examples 3–5, lower pressures would be used if the chilling period were extended or the meat frozen and defrosted before pressing.

Having described the preferred form of my invention it is apparent that modifications in this form may be made and other forms found to be equally advantageous which, nevertheless, are based upon the principle of this invention.

The following is claimed:

1. A process for tenderizing meat consisting essentially of the steps of aging the meat by chilling at approximately 34° F. for a period within the range of 24 to 96 hours after slaughter, separating the meat into cuts which have the muscle fibers arranged substantially in the same direction, and applying pressure within the range of 50 to 100 pounds per square inch to one surface of each of said meat cuts substantially perpendicularly to the direction of the muscle fibers while supporting the opposite side thereof against said pressure whereby said pressure causes a tearing and separating of the connective tissue from said muscle fibers without damaging said muscle fibers and permitting deformation in the direction of the muscle fibers while preventing substantial deformation of the meat cut in a direction across the fibers.

2. A process according to claim 1 wherein the meat treated is about 1 to 2 inches in thickness and wherein said pressure is applied across at least one surface of the meat cut progressively from one end of the meat cut to the other end first in one direction and then in the opposing direction.

* * * * *

UNITED STATES PATENT OFFICE
CERTIFICATE OF CORRECTION

Patent No. 3,635,731          Dated January 18, 1972

Inventor(s) Charles W. Korten

It is certified that error appears in the above-identified patent and that said Letters Patent are hereby corrected as shown below:

Column 3, line 3, change "bonded" to ---boned---

Column 3, line 26, change "equalized" to ---equal-sized---

Column 4, line 17, after "shear" insert---press---

Column 4, line 36, change "processing" to---pressing---

Column 4, Example 2, delete "1" before "Frozen pressed" second occurrence.

Column 4, Example 2, insert "6.0" in the column entitled "Panel" under the number "7.8"

Column 6, line 9, after "4" insert---inches---

Signed and sealed this 6th day of June 1972.

(SEAL)
Attest:

EDWARD M. FLETCHER, JR.       ROBERT GOTTSCHALK
Attesting Officer              Commissioner of Patents